United States Patent [19]

Bertiger et al.

[11] Patent Number: 5,017,925

[45] Date of Patent: May 21, 1991

[54] MULTIPLE BEAM DEPLOYABLE SPACE ANTENNA SYSTEM

[75] Inventors: Bary R. Bertiger, Scottsdale; Raymond J. Leopold, Chandler; Kenneth M. Peterson, Phoenix, all of Ariz.

[73] Assignee: Motorola, Inc., Schaumburg, Ill.

[21] Appl. No.: 596,623

[22] Filed: Oct. 10, 1990

Related U.S. Application Data

[63] Continuation of Ser. No. 415,814, Oct. 2, 1989, abandoned.

[51] Int. Cl.[5] .............................................. H04B 7/185

[52] U.S. Cl. ............................ 342/352; 343/DIG. 2; 342/353

[58] Field of Search ....................... 342/352, 353, 356; 343/DIG. 2, 898, 705, 708, 776

[56] References Cited

U.S. PATENT DOCUMENTS 3,095,538 6/1963 Silberstein .

3,188,640 6/1965 Simon et al. .

*Primary Examiner*—Theodore M. Blum

*Attorney, Agent, or Firm*—Frank J. Bogacz

[57] ABSTRACT

A multiple beam space antenna system for facilitating communications between a satellite switch and a plurality of earth-based stations is shown. The antenna is deployed after the satellite is in orbit by inflation of a raft-type supporting structure which contains a number of antenna horns. These antenna horns are oriented in substantially concentric circular groups about a centrally located antenna horn. Each of the antenna beams projects an area on the earth. Each of the areas of the beams are contiguous. As a result, one large area is subdivided into many smaller areas to facilitate communications. In addition, a lens may be employed to focus the beams of the horn antennas.

25 Claims, 5 Drawing Sheets

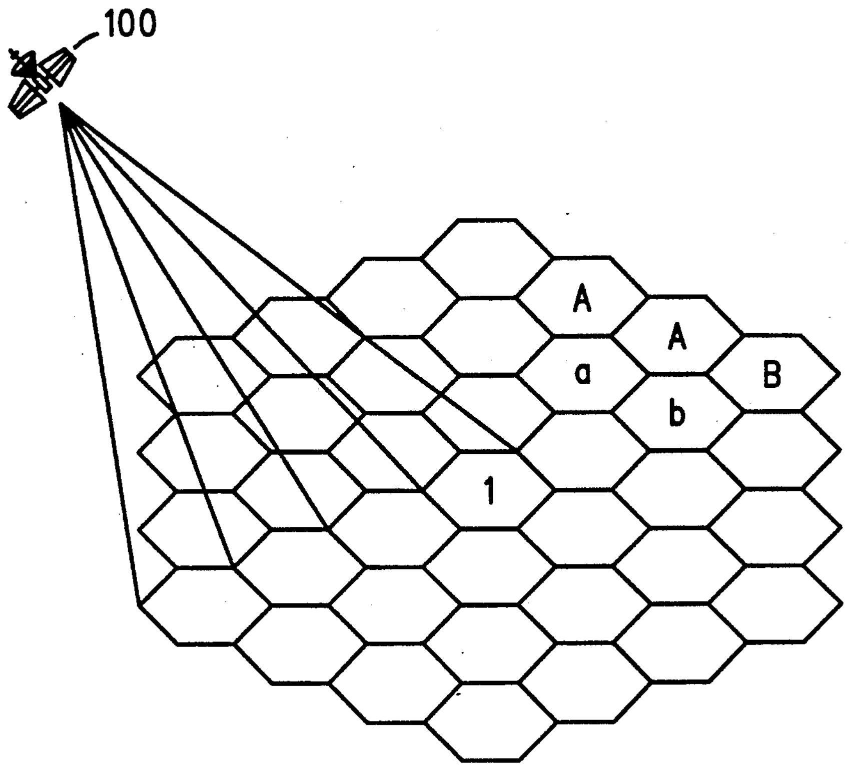
FIG. 1
FIG. 2
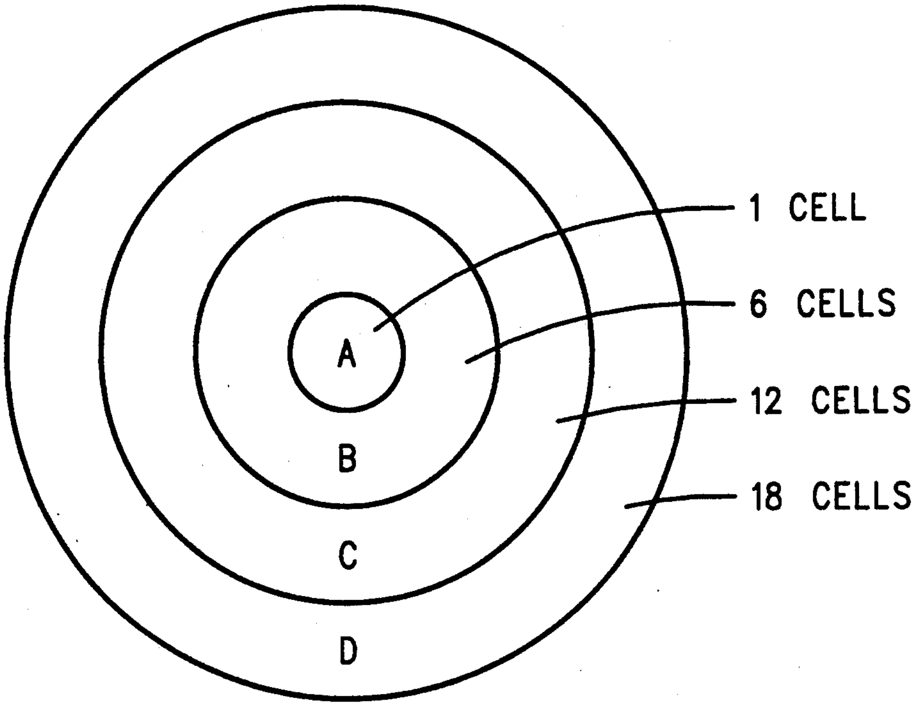

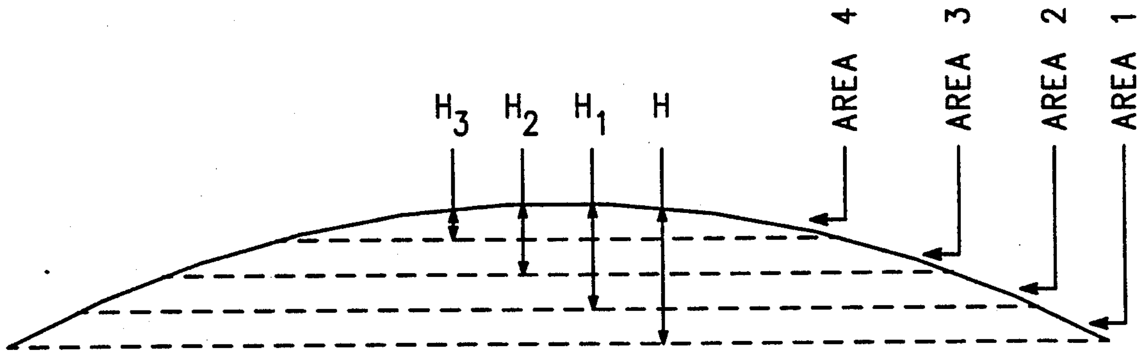
FIG. 3
FIG. 4
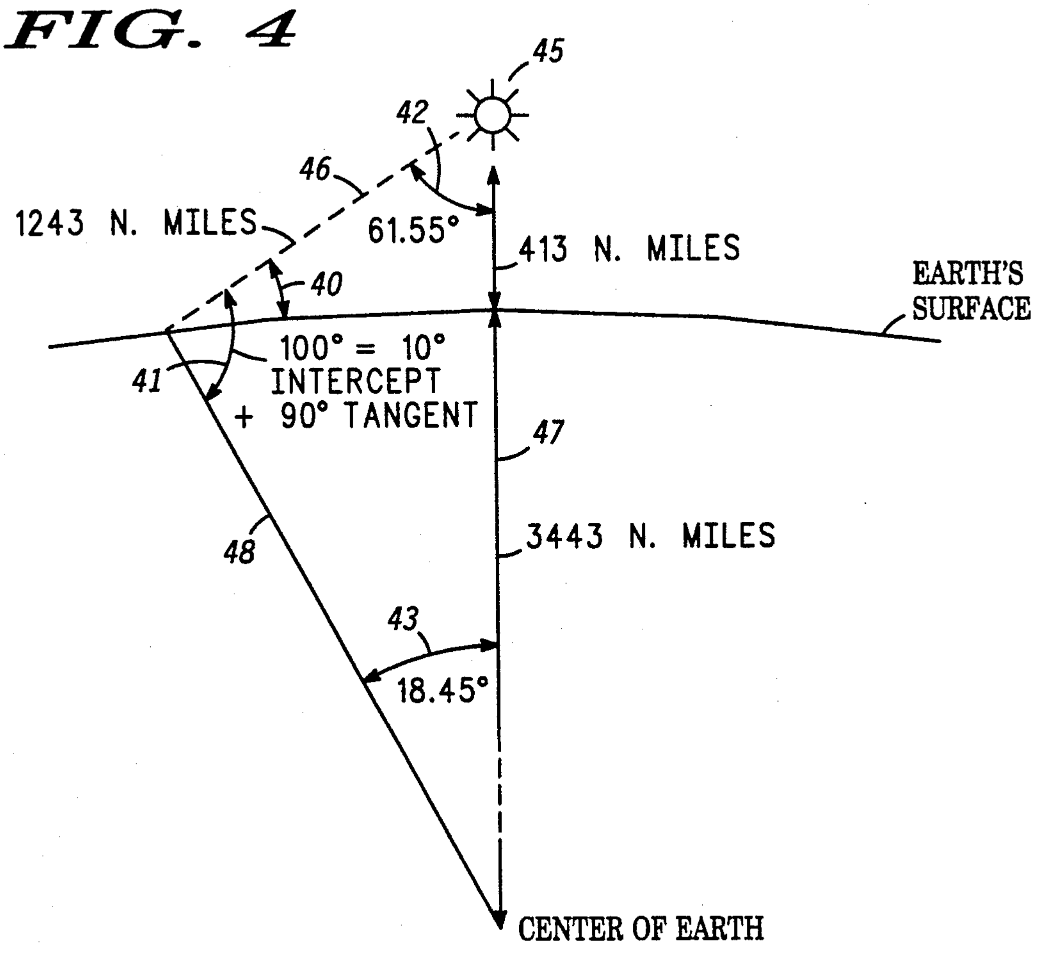

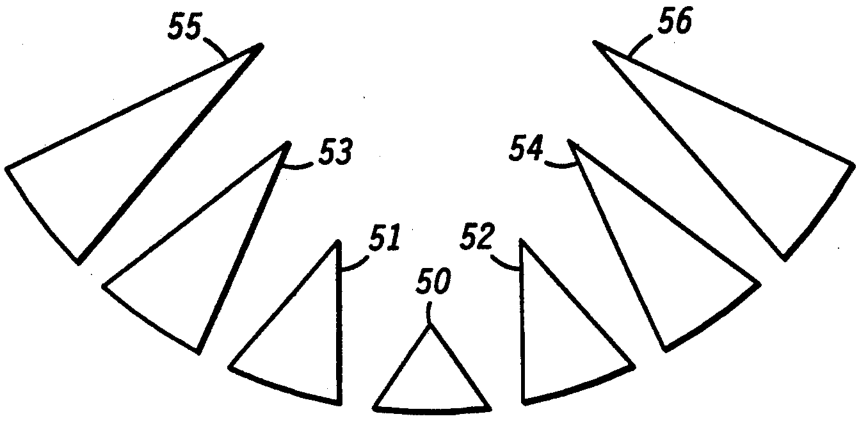
FIG. 5
FIG. 6
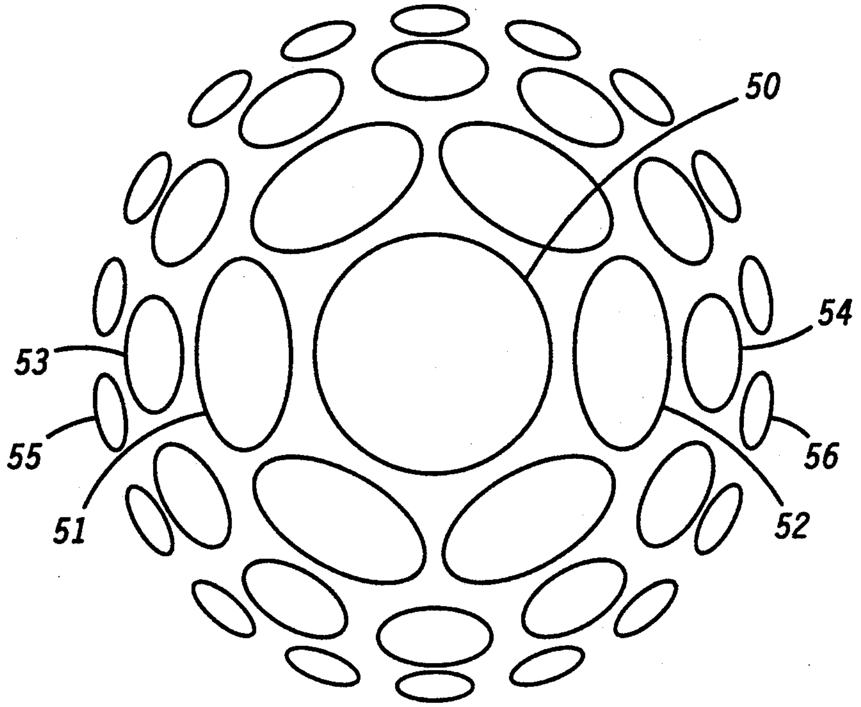

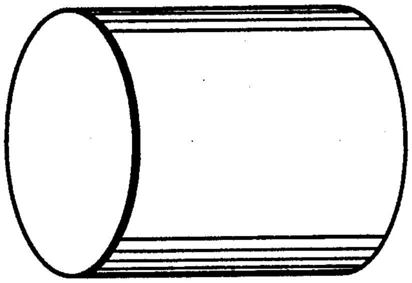
FIG. 7A
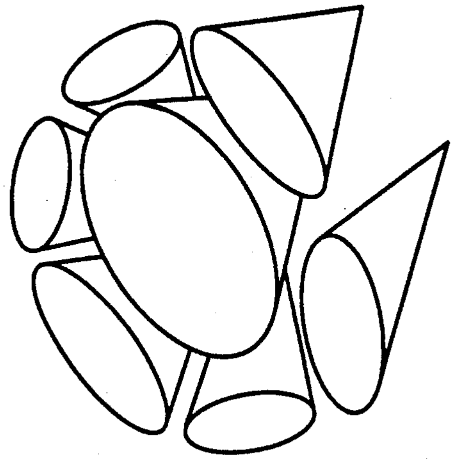
FIG. 7B
FIG. 7C
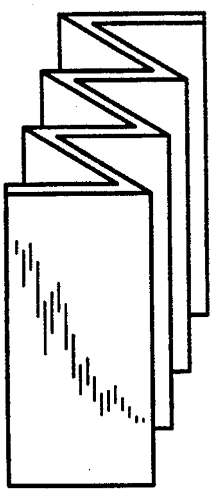
FIG. 7D
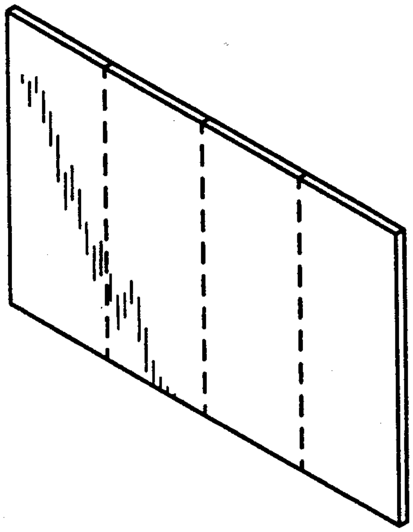

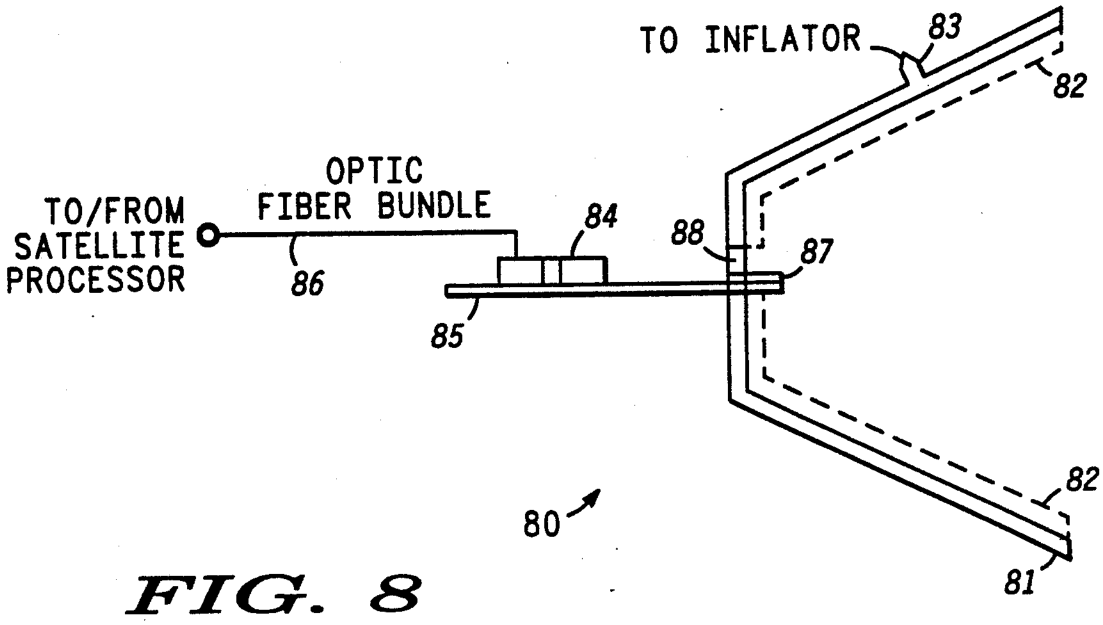
FIG. 8
FIG. 9
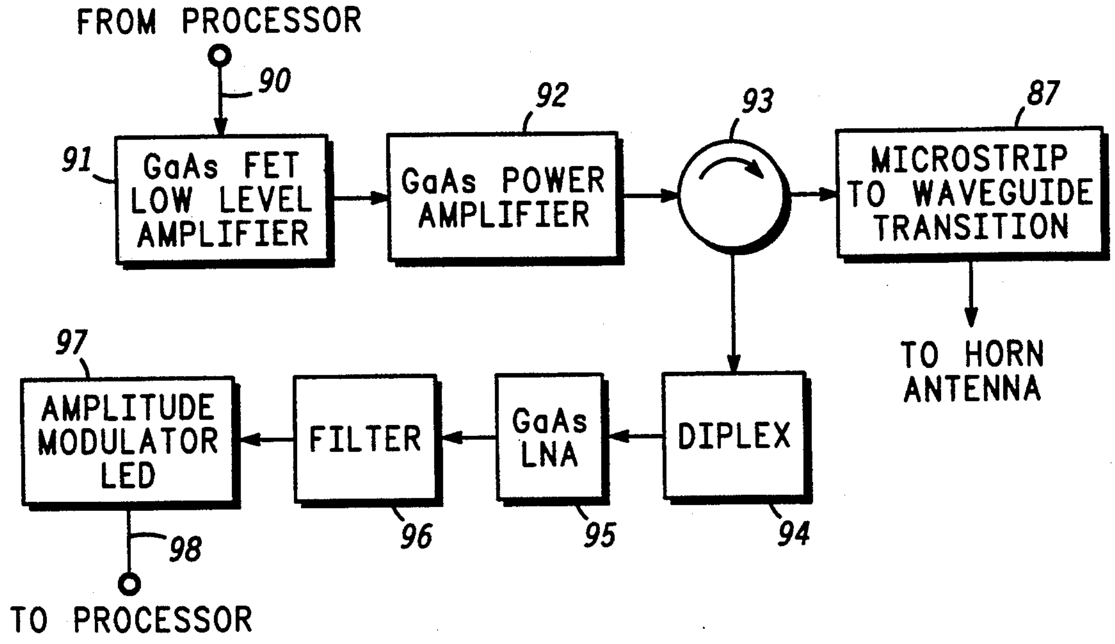

MULTIPLE BEAM DEPLOYABLE SPACE ANTENNA SYSTEM

This application is a continuation of prior application Ser. No. 415,814, filed Oct. 2, 1989, now abandoned.

CROSS REFERENCE TO RELATED APPLICATIONS

The present application is related to copending U.S. patent applications Ser. Nos. 263,849; 402,743; 415,842; 415,815 and 414,494.

BACKGROUND OF THE INVENTION

The present invention pertains to antenna systems for spacecraft and more particularly to a deployable antenna array system which projects a multiple beam pattern with each beam covering a disjoint area.

Spacecraft typically achieve communications (i.e. "uplinks" and "downlinks") with earth-based stations by projecting spot beams to certain areas. These earth-base systems may include but are not limited to land-based stations, water-based stations, such as those located on ships, stations based on airplanes or other spacecraft. The spot beams which are projected by spacecraft may be relatively narrow or broad beams. Small beams are easily focused upon a known earth-based source. For communication situations in which many sources are randomly located over a portion of the earth, that entire portion of the earth must be covered by the antenna system.

For communication by the satellite with a number of earth-based stations, a limited number of communications frequencies or channels exist. Spatial diversity between satellite antenna beams is required. Therefore, satellite communication with a plurality of earth stations is limited to the number of antenna beams (or cells) projected by the antenna system. As cell numbers are increased, spatial diversity becomes difficult to maintain.

In addition, a large number of satellite antennas is difficult to launch into space. Furthermore, large numbers of antennas are difficult to position and deploy in space once the launching vehicle has achieved proper orbit.

Accordingly, it is an object of the present invention to provide uniformly sized spot beams for facilitating communications between satellites and a plurality of earthbased stations.

SUMMARY OF THE INVENTION

In accomplishing the object of the present invention, a novel multiple beam deployable space antenna system is shown.

A multiple beam space antenna system facilitates communications between a satellite and a plurality of earth stations. The multiple beam space antenna system has a plurality of antennas which are disposed in a spherical configuration. Each of the plurality of antennas is positioned so that each antenna establishes communications with a substantially distinct area of the earth.

Each of the antennas receives a plurality of communications from the earth stations. Each antenna also transmits a plurality of communications from the satellite to the earth stations. Each of the antennas is connected to a processor of the satellite for enabling the processor to receive and transmit messages from a number of earth stations.

The above and other objects, features, and advantages of the present invention will be better understood from the following detailed description taken in conjunction with the accompanying drawings.

BRIEF DESCRIPTION OF THE DRAWING

FIG. 1 depicts a satellite's projection of its antenna beams comprising the present invention.

FIG. 2 is a top view of the projection of the antenna beams onto the earth.

FIG. 3 is a side view of the antenna beam projections as shown in FIG. 2.

FIG. 4 depicts the intercept angle formed by the satellite's antenna beams.

FIG. 5 depicts a portion of the antenna horns of the present invention.

FIG. 6 is a two-dimensional representation of the antenna horn system of the present invention.

FIGS. *7a–7d* depict the deployed horn structure and lens structure of the present invention.

FIG. 8 is a diagram of one particular horn of the antenna system of the present invention.

FIG. 9 is a block diagram of the monolithic microwave integrated circuit (MMIC) shown in FIG. 8.

DESCRIPTION OF THE PREFERRED EMBODIMENT

The disclosures and teachings of U.S. patent application Ser. Nos. 263,849; 402,743; 415,842; 415,815; and 414,494 are hereby incorporated by reference.

FIG. 1 depicts satellite 100 projecting a multiple beam space antenna array. Satellite 100 includes a processor (not shown) for communication transmission and reception. Each hexagonal area, such as number 1, represents an individual cell which has been projected by an antenna beam. This projection shows cell 1 surrounded by three successively larger rings of similarly shaped cells. The cells actually projected by beams of satellite 100 for communications are elliptical in nature. The cells shown in FIG. 1 are the result of intersecting elliptical antenna beams. The six sides of each hexagon depict the chords which bisect the intersection of each of the elliptical beams.

In this configuration, 37 beams are projected by the antenna system of the satellite 100. Each of the 37 antenna is electrically and optically connected to the processor of the satellite. Since the satellite represents a point in space and the earth's surface is a sphere, it is necessary that each of the cells represent approximately the same area.

Each of the cells represents a plurality of frequencies about a center frequency. This aids in establishing communication between satellite 100 and a plurality of users in each particular cell on the earth. Since the satellite is in orbit about the earth, a communication link between a user in one cell and satellite 100 must be handed off to another adjacent cell as the satellite moves in orbit. The frequency assignment of the cells is such that there are four basic frequency groups used. A particular one of the four frequency groups is selected for center cell 1 area. Then, assignments are made circularly about cell 1 such that no two adjacent cells use the same one of the four frequency groups. This provides spatial diversity and for frequency re-use from group-to-group.

The 37 cells of FIG. 1 may be represented from a top view as shown in FIG. 2. The centermost ring A of the "bull's-eye" (concentric circles or rings) of FIG. 2 represents the center cell 1 of FIG. 1. The next, ring outside the center cell A is the ring B. Ring B includes six cells surrounding center cell 1. The ring adjacent to ring B is ring C. Ring C contains twelve cells surrounding ring B. The last ring surrounding ring C is ring D. Ring D contains eighteen cells surrounding ring C. As a result, in all the satellite projects 37 separate cells to provide an area of coverage for transmission uplinks and downlinks with respect to the satellite.

Each cell represents 1/37 of the total area of the entire cell pattern projected by a particular satellite. FIG. 3 depicts the total area from the satellite to the earth's surface. FIG. 3 is a side view and depicts the heights of the various rings as was shown in FIG. 2. That is, area 4 pertains to ring A, area 3 pertains to ring B, area 2 corresponds to ring C and area 1 corresponds to ring D. The total area of the satellite's projections may be calculated by the formula, area$=2\pi rh$, where r is the radius and h is the height of the spherical segment of the sphere and $\pi$=approximately 3.14159.

The area for each of the rings shown in FIGS. 2 and 3 as well as the total area may be calculated by the equations given below.

Total area$=2\pi rh$

Area 1$=2\pi r(h-h1)$

Area 2$=2\pi r(h1-h2)$

Area 3$=2\pi r(h2-h3)$

Area 4$=2\pi rh3$

FIG. 4 depicts the geometry of a particular satellite in orbit approximately 413 nautical miles above the earth's surface. It is assumed that the outside edge of ring D as shown in FIG. 2 when viewed from the satellite will intercept the earth at a 10 degree angle. This 10 degree angle 40 is termed the "mask angle". Satellite 45 is shown approximately 413 nautical miles above the earth's surface. From satellite 45 to the outer edge of ring D, as shown in FIG. 2, the distance 46 is approximately 1,243 nautical miles as shown in FIG. 4. The angle between the earth's surface and a line from the edge of outer ring D to satellite 45 is angle 40. This angle is the 20 degree mask angle.

Angle 41 is approximately 100 degrees. Angle 41 is made up of the 10 degree mask angle and a 90 degree tangent angle. The 90 degree tangent angle (angle 41 – angle 40) is comprised of a line segment 46 from the center of the earth to the earth's surface and the tangent to the earth's surface at that point (not shown). Angle 43 is the angle composed of line segments 47 from the satellite to the center of the earth and line segment 48 from the center of the earth to the point of the outer extent ring D. This angle is approximately 18.45 degrees. The distance from the center of the earth to the earth's surface is approximately 3,443 nautical miles, as shown in FIG. 4 line segment 47.

Angle 42 is the angle between line segments 46 and 47. Line segment 46 is a 1,243 nautical mile line segment between satellite 45 and the outer edge of ring D of the satellite's cell projections. Line segment 47 is a line directly from satellite 45 perpendicular to the earth's surface terminating at the center of the earth. For the present configuration shown in FIG. 4, angle 42 is approximately 61.55 degrees.

Referring again to FIGS. 1 and 2, the center of each of the six cells in ring B is equidistant from the center of the middle cell 1 (ring). The same is not true for the distance between the center of each cell and middle cell 1 for rings C and D.

Referring to FIG. 1, cell "a" is closer to the center of cell 1 than cell "b" is. Both cells a and b are located in the C cell ring. The C ring contains twelve cells. The "a" and "b" cells alternate around ring C. That is, ring C contains alternate "a" and "b" cells.

Similarly, ring D which is comprised of eighteen cells, includes "A" and "B" cells. Each of the A cells is equidistant to the center of cell 1. Each of the B cells is also equidistant with respect to the center of cell 1. However, the A cells are closer to the center of cell 1 than the B cells. With respect to ring D of the cells as shown in FIG. 1, the pattern of "A" and "B" cells is different than the "a" and "b" cells of ring C. Ring D has a pattern of one B cell and two A cells following. This pattern continues around ring D.

The angular differences from the satellite to the "a" and "b" cells or to the "A" and "B" cells must be accounted for in the positioning of each of the antennas of the satellite antenna system. For the purposes of further discussion, the a-b and A-B anomalies discussed above will not be taken into account. However, the positioning indications derived herein must be modified slightly to account for these anomalies in view of a specific altitude of the orbiting satellite.

For further discussions, rings C and D will be considered as having each cell equidistant to the center of cell 1. For a height of a satellite over the earth of 413 nautical miles, the resultant antenna angles for the 37 cells of FIG. 1 are shown summarized in Table 1. The center cell is cell ring A which is comprised of a single cell, cell 1. This cell size is approximately a 41.5 degree circle with respect to the satellite. This antenna would produce a gain of approximately 13.8 dB. In general, gain is calculated in terms of a maximum theoretical gain represented by an antenna of x radians by y radians. The formula for this gain is given as follows:

$$\text{Gain (dB)}=10\log(4\pi+xy)$$

The $r^2$ loss refers to the loss due to the range of the satellite from earth. This loss increases as the square of the range. Lastly, the mask angle represents the range of values for a line of sight from the ground to the satellite within a cell in that particular ring. There is only one cell in ring A.

The first actual ring of cells of Table 1 is ring B as shown in FIG. 2. The second and third rings of Table 1 correspond to rings C and D of FIG. 2 respectively.

TABLE 1

ANTENNA PARAMETERS - 413 NMI SATELLITE

| | CELL SIZE | GAIN | $R^2$ LOSS* | MASK ANGLE |
|---|---|---|---|---|
| CENTER CELL (A) | 41.5° CIRCLE | 13.8 dB | 0.3 dB | 67° TO 90° |
| FIRST RING (B) | 22.3° × 60° ELLIPSE | 14.9 dB | 3.2 dB | 40° TO 67° |
| SECOND RING (C) | 10.5° × 30° ELLIPSE | 21.2 dB | 5.7 dB | 26° TO 40° |

TABLE 1-continued

| ANTENNA PARAMETERS - 413 NMI SATELLITE | | | | |
|---|---|---|---|---|
| | CELL SIZE | GAIN | $R^2$ LOSS* | MASK ANGLE |
| THIRD RING (D) | 7.9° × 20° ELLIPSE | 24.2 dB | 91.5 dB | 10° to 26° |

*WORSE CASE RANGE LOSS COMPARED TO 413 NMI.

Table 2 depicts similar parameters for each of the cells shown in FIGS. 1 and 2 for a satellite at a height of 490 nautical miles over the earth. It is to be noted that the parameters for this increased height of the satellite are not substantially different from the first example given in Table 1.

TABLE 2

| ANTENNA PARAMETERS - 490 NMI SATELLITE | | | | |
|---|---|---|---|---|
| | CELL SIZE | GAIN | $R^2$ LOSS* | MASK ANGLE |
| CENTER CELL (A) | 34.5° CIRCLE | 15.4 dB | 0.5 dB | 70° TO 90° |
| FIRST RING (B) | 20.5° × 60° ELLIPSE | 15.3 dB | 1.4 dB | 46° TO 70° |
| SECOND RING (C) | 11.1° × 30° ELLIPSE | 20.9 dB | 4.6 dB | 31° TO 46° |
| THIRD RING (D) | 9.75° × 20° ELLIPSE | 23.4 dB | 8.3 dB | 13° to 31° |

*WORSE CASE RANGE LOSS COMPARED TO 490 NMI.

Referring to Table 1, the antennas of the third ring or ring D require a 7.9 degree projection. As a result, an aperture of approximately 4 meters would be required. Small satellites or spacecraft may be typically a cylinder with a 2 meter height and a 1.5 meter approximate diameter. The present antenna array system may be transported via satellite by a cannister of approximately 1 meter diameter and 0.3 meters high.

Referring to FIG. 5, a cross section of the antenna array of the present invention is shown. FIG. 5 depicts horn antennas 50 through 56. These horn antennas represent antennas in each of the four rings A though E as mentioned in FIG. 2. Horn antenna 50 represents center cell 1 or ring A as shown in FIGS. 1 and 2 respectively. Horn antennas 51 and 52 represent two of the antennas within ring B as shown in FIG. 2. Horn antennas 53 and 54 represent two of the twelve antennas in ring C of the present antenna system. Lastly, horn antennas 55 and 56 represent two of the eighteen antennas in ring D of the antenna system.

First, it is to be noted that the antenna horns are disposed in a spherical configuration with antenna horn 50 which generates the center cell being at the center of the portion of the sphere. Second, it is to be noted that as we move from the center antenna 50 to antennas 51 and 52 of ring B that the length of the horn antenna is increased. Similarly, the horn antennas 53 and 54 of ring C are increased in size over 51 and 52 of ring B. Similarly, horn antennas 55 and 56 of ring B are longer than horn antennas 53 and 54 of ring C.

It can also be seen from the cross section of FIG. 5 that the antenna horns are mounted in a hemispherical position in order to achieve the cell projections shown in FIG. 1. The longest horns are those in ring D. The horns in ring D as exemplified by horns 55 and 56 would require an aperture of approximately 4 meters in length. The construction of the horns themselves may be of a metallized mylar. This antenna horn may be implemented as a spherically shaped mylar structure. This structure may be collapsed in a cannister prior to being placed into space. The antenna system may be deployed similar to the manner in which an inflatable rubber raft is inflated. That is, once the satellite is in proper position in space, the antenna may be deployed by inflation with a propellent in order for the antenna system to take its spherical shape of horn antennas.

FIG. 6 is a two-dimensional view of the horn antenna structure when deployed, looking up directly from beneath the satellite. Horn antennas 50 through 56 of FIG. 5 are shown depicted in FIG. 6. FIG. 6 shows that a view field from the satellite to the earth is the same in all directions. Horn antenna 50 appears as a circle. Antennas 51–56 appear as ellipses since they are angularly tilted.

Referring to FIG. 7A, the cannister mentioned above with the deflated horn antenna structure inside is shown. When the horn antenna system is inflated, its appearance would be similar to that shown in FIG. 7B. From this figure, as well as FIG. 5, it can be seen that the center horn antenna has the shortest length and the length of the horns increase as they move away from the center horn antenna of the structure. The diameter of the entire antenna system, that is, the outer diameter of ring D, may be approximately two feet.

Since antenna transmissions disperse over distance and these transmissions also produce sidelobes, a lens arrangement may be employed to suppress sidelobes and limit diffusion of the signals. FIG. 7C shows a bootlace lens in folded position which may be used to suppress sidelobes and limit diffusion. This bootlace lens is a planer lens. The bootlace lens is placed in front of the horn antenna structure, such that signals transmitted from the antennas or received by the antennas must pass through the planer lens. When the bootlace lens is deployed, its appearance would be as that of FIG. 7D. The bootlace lens may not be deployed in a similar fashion to the basic horn antenna structure. That is, the lens may not be inflated. The bootlace lens requires mechanical tuning. As a result, the bootlace lens may be constructed of a rigid material which would be deployed in planer sections similar to a solar cell array of a satellite.

FIG. 8 depicts one typical horn 80 of the multiple horn antenna array shown in FIG. 7B. Horn antenna 80 includes an inflatable truncated cone shape mylar structure 81. The interior surfaces of mylar cone 81 are metallized with conductive layer 82. This conductive layer or film may be implemented with such metals as gold or aluminum. Attached to the mylar cone is valve 83. Valve 83 provides for proper deployment of the cone structure 80 by inflation. Other valves (not shown) provide for inflating the supporting rubber raft structure mentioned above. Valve 83 is connected to a supply of gas (not shown) which is used to inflate the mylar structure upon deployment of the antenna system in space. Propellants such as nitrogen or foam may be used for inflation.

Microstrip to waveguide transition 87 is connected via an aperture 88 in the bottom portion of the cone to dielectric substrate 85. Dielectric substrate 85 provides for electrical isolation of the input and output signals as well as the mounting of MMIC circuitry 84. The microstrip to waveguide transition 87 provides for the reception and transmission of signals from radio, telephones or similar devices located on the earth. Incoming signals are transmitted from the waveguide structure 87 to the MMIC circuit 84. MMIC circuit 84 both receives and transmits signals and produces at its output an optical signal for transmission to or from the satellite's processor (not shown) via optical fiber 86. Coaxial cable may be used in place of the optical fiber 86.

Referring to FIG. 9, a block diagram of the MMIC (Microwave Monolithic Integrated Circuit) 84 of FIG. 8 is shown. Optical fiber 90 is connected to low level amplifier 91. Amplifier 91 is connected to power amplifier 92. Amplifier 92 is connected to circulator 93. Circulator 93 is connected to microstrip to waveguide transition 87. Microstrip waveguide 88 is connected to the horn antenna. Incoming signals are transmitted to microstrip 87. These signals are then transmitted to diplex 94 via circulator 93. Circulator 93 is also connected to diplexer 94. Diplexer 94 is connected to LNA (Low Noise Amplifier) 95. LNA 95 is connected to filter 96. Filter 96 is connected to amplitude modulation LED 97. Optic fiber 98 connects electrical to optical device 97 to the satellite's processor.

Optical signals are transmitted via optical fiber 90 to FET amplifier 91. FET amplifier 91 converts the optical signal to an electrical signal and transmits this to MMIC power amplifier 92. Amplifier 92 produces an amplified signal which is transmitted through circulator 93 to the microstrip 87. Circulator 93 may comprise a waveguide with magnet. The circulator 93 transmits signals from an input node to an output node in the clockwise direction. In the counter clockwise direction signals from an input node are blocked. These signals are then transmitted through the horn to earth-based stations.

Incoming signals are transmitted through microstrip 87 through distributor 93 to diplexer 94. Diplexer 94 acts as a filter and removes transmitting or other undesirable frequencies. LNA 95 amplifies the signal. The incoming signals are then filtered by filter 96. The filtered signal is transmitted to electrical to amplitude modulation LED 97 which amplifies the signal and then amplitude modulates by superposition in a bias line a diode laser, light emitting diode or other similar device. The electrical signal is converted to an optical signal and transmitted via fiber 98 through the satellite's processor. The FET amplifier 91 may be implemented with a gallium arsenide FET. The light photons input to such a device cause modulation of the gate voltage of the FET. MMIC amplifier 92 may be implemented with a gallium arsenide MMIC amplifier.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A multiple beam space antenna system for facilitating communications between a satellite and a plurality of earth stations, said multiple beam space antenna system comprising:

a plurality of antenna means disposed in a semispherical configuration about a surface of said satellite, each of said plurality of antenna means positioned so that each antenna means establishes said communications with a substantially distinct area of the earth, said plurality of antenna means including:

a first plurality of antenna means circularly disposed;

a second plurality of antenna means disposed circularly about said first plurality of antenna means; and a third plurality of antenna means disposed circularly about said second plurality of antenna means; and each of said antenna means for receiving a plurality of communications from said earth stations in a corresponding area and for transmitting a plurality of communications to said earth stations in said corresponding area; and each of said antenna means being connected to a processor of said satellite for enabling the processor to receive and transmit messages from a number of earth stations.

2. A multiple beam space antenna system as claimed in claim 1, wherein said first plurality of antenna means includes:

antenna means centrally located with respect to said first, second and third pluralities of antenna means.

3. A multiple beam space antenna system as claimed in claim 2, wherein said antenna means and each of said first, second and third pluralities of antenna means project beams on a planet-like body such that said projected beams of said antenna means, said first plurality, said second plurality and said third plurality of antenna means are contiguous beams and form a large area for receiving and transmitting a plurality of signals between earth stations and said satellite.

4. A multiple beam space antenna system as claimed in claim 3, wherein said projected beams of said antenna means, said first plurality of antenna means, said second plurality of antenna means and said third plurality of antenna means form substantially concentric circular areas for facilitating communications between said satellite and said plurality of earth stations.

5. A multiple beam space antenna system as claimed in claim 4, wherein:

said antenna means includes horn antenna means;

said first plurality of antenna means includes a first plurality of horn antenna means;

said second plurality of antenna means includes a second plurality of horn antenna means; and said third plurality of antenna means includes a third plurality of horn antenna means.

6. A multiple beam space antenna system as claimed in claim 5, wherein:

said horn antenna means includes at least one horn antenna means;

said first plurality of horn antenna means includes approximately six horn antenna means;

said second plurality of horn antenna means includes approximately twelve horn antenna means; and said third plurality of horn antenna means includes approximately eighteen horn antenna means.

7. A multiple beam space antenna system as claimed in claim 5, wherein each of said beams projected by said horn antenna means, said first plurality of horn antenna means, said second plurality of horn antenna means and said third plurality of horn antenna means are substantially hexagonal in shape.

8. A multiple beam space antenna system as claimed in claim 5, wherein:

said horn antenna means includes cone means of a first length;

said first plurality of horn antenna means each including cone means of a second length being greater than said first length;

said second plurality of horn antenna means each including cones means of a third length being greater than said second length; and said third plurality of horn antenna means each including cone means of a fourth length being greater than said third length.

9. A multiple beam space antenna system as claimed in claim 8, wherein there is further included inflatable means for supporting each of said horn antenna means, said inflatable means for support and each of said cone means being inflated to produce said spherical configuration of said pluralities of said horn antenna means.

10. A multiple beam space antenna system as claimed in claim 5, wherein there is further included cannister means for containing each of said pluralities of said horn antenna means and said inflatable means for support on board said satellite, so that said inflatable means for support may be removed from said cannister means during orbiting of said satellite.

11. A multiple beam space antenna system as claimed in claim 5, wherein there is further included lens means positioned between said plurality of horn antenna means and said projections of said beams on said planet-like body, said lens means operating to focus said beams of said plurality of horn antennas.

12. A multiple beam space antenna system as claimed in claim 11, wherein said lens means includes bootlace lens means.

13. A multiple beam space antenna system as claimed in claim 12, wherein said bootlace lens means includes folding bootlace lens means.

14. A multiple beam space antenna system as claimed in claim 5, wherein each of said horn antenna means includes:

truncated cone means including a truncated portion for projecting said beams upon said planet-like bodies;

coating means applied to said inner surface of said truncated cone means;

waveguide means positioned centrally to said truncated portion of said truncated cone means, said waveguide means for translating electronic signals to RF signals and for translating RF signals to electronic signals;

circuit means connected to said waveguide means, said circuit means operating to interface signals between said processor of said satellite and said waveguide means; and connection means connected between said circuit means and said processor of said satellite, said connection means operating to transmit signals between said circuit means and said processor.

15. A multiple beam space antenna system as claimed in claim 14, wherein said truncated cone means includes mylar truncated cone means.

16. A multiple beam space antenna system as claimed in claim 15, wherein there is further included inflation means connected to said mylar truncated cone means, said inflation means operating to permit inflation of said mylar truncated cone means to a particular predetermined shape.

17. A multiple beam space antenna system as claimed in claim 14, wherein said coating means includes metallized coating means such as aluminum.

18. A multiple beam space antenna system as claimed in claim 17, wherein said metallized coating means comprises gold.

19. A multiple beam space antenna system as claimed in claim 14, wherein said connection means includes optic fiber means.

20. A multiple beam space antenna system as claimed in claim 14, wherein said connection means includes coaxial cable means.

21. A multiple beam space antenna system as claimed in claim 14, wherein there is further included dielectric substrate means connected to said circuit means and to said waveguide means, said dielectric substrate means for supporting said circuit means and said waveguide means.

22. A multiple beam space antenna system as claimed in claim 14, wherein said circuit means includes:

low level amplifier means connected to said processor, said low level amplifier means for converting optic signals to electronic signals;

power amplifier means connected to said low level amplifier means;

circulator means connected to said power amplifier, said circulator means having three input and output ports and operating to transmit signals from an input port to an output port in a clockwise direction only; and said waveguide means being connected to said circulator means.

23. A multiple beam space antenna system as claimed in claim 22, wherein said circuit means further includes:

diplexer means connected to said circulator means, said diplexer means operating to pass only received signals;

low noise amplifier means connected to said diplex means;

filter means connected to said low noise amplifier means; and amplitude modulation means connected between said filter means and said processor of said satellite.

24. A multiple beam space antenna system as claimed in claim 22, wherein said connection of said processor to said low level amplifier means and said connection of said amplitude modulation means to said processor each include optic fiber.

25. A multiple beam space antenna system for facilitating communications between a satellite and a plurality of earth stations, said multiple beam space antenna system comprising:

a plurality of antenna means disposed in a semispherical configuration about a surface of said satellite, each of said plurality of antenna means positioned so that each antenna means establishes said communication with a substantially distinct area of the earth;

said plurality of antenna means including a plurality of horn antenna means having waveguide means for transmitting and receiving RF signals and circuit means for interfacing between said waveguide means and a processor of said satellite;

inflatable support means for positioning each of said plurality of horn means in said spherical configuration;

each of said antenna means for receiving a plurality of communications from said earth stations in a corresponding area and for transmitting a plurality of communications to said earth stations in said corresponding area; and each of said antenna means being connected to said processor of said satellite for enabling the processor to receive and transmit messages.

* * * * *